United States Patent
Chang (10) Patent No.: US 7,499,239 B2
(45) Date of Patent: *Mar. 3, 2009

(54) FEEDFORWARD CONTROLLER AND METHODS FOR USE THEREWITH

(75) Inventor: Michael Chang, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/872,474

(22) Filed: Oct. 15, 2007

(65) Prior Publication Data

US 2008/0030892 A1 Feb. 7, 2008

Related U.S. Application Data

(63) Continuation of application No. 11/443,806, filed on May 30, 2006, now Pat. No. 7,295,397.

(51) Int. Cl.
*G11B 5/596* (2006.01)
(52) U.S. Cl. .................................. 360/78.09
(58) Field of Classification Search ............. 360/78.09, 360/75, 78.04, 77.04, 46, 77.05, 77.03; 369/44.29; 700/94
See application file for complete search history.

(56) References Cited

U.S. PATENT DOCUMENTS

| | | | | | |
|---|---|---|---|---|---|
| 4,535,372 | A | * | 8/1985 | Yeakley | 360/77.05 |
| 4,594,622 | A | * | 6/1986 | Wallis | 360/77.04 |
| 6,859,341 | B2 | * | 2/2005 | Min et al. | 360/77.04 |
| 7,012,777 | B1 | * | 3/2006 | Hirano et al. | 360/77.03 |
| 7,167,327 | B2 | * | 1/2007 | Feyh | 360/46 |
| 7,206,162 | B2 | * | 4/2007 | Semba et al. | 360/78.04 |
| 2003/0147172 | A1 | * | 8/2003 | Singer et al. | 360/78.04 |
| 2005/0002291 | A1 | * | 1/2005 | Takeuchi | 369/44.29 |
| 2006/0276918 | A1 | * | 12/2006 | Cioffi et al. | 700/94 |
| 2007/0070540 | A1 | * | 3/2007 | Noguchi et al. | 360/75 |
| 2008/0037155 | A1 | * | 2/2008 | Hirano et al. | 360/75 |

* cited by examiner

*Primary Examiner*—Fred Tzeng
(74) *Attorney, Agent, or Firm*—Garlick Harrison & Markison; Bruce E. Stuckman (57) ABSTRACT

A controller includes a combining module that generates a total control signal for the drive device of a disk drive by combining a feedback control signal and a feedforward control signal. A feedback control module generates the feedback control signal in response to at least one state of the drive device. A feedforward control module generates the feedforward control signal based on a smoothing function and a feedforward control function.

19 Claims, 8 Drawing Sheets

FIG. 13

FEEDFORWARD CONTROLLER AND METHODS FOR USE THEREWITH

CROSS REFERENCE TO RELATED APPLICATIONS

The present application claims priority under 35 U.S.C. § 120 as a continuation of U.S. application Ser. No. 11/443,806 entitled, FEEDFORWARD CONTROLLER AND METHODS FOR USE THEREWITH, filed on May 30, 2006 now U.S. Pat. No. 7,295,397.

BACKGROUND OF THE INVENTION

1. Technical Field of the Invention

The present invention relates to controllers, disk drives and related methods.

2. Description of Related Art

As is known, many varieties of disk drives, such as magnetic disk drives are used to provide data storage for a host device, either directly, or through a network such as a storage area network (SAN) or network attached storage (NAS). Typical host devices include stand alone computer systems such as a desktop or laptop computer, enterprise storage devices such as servers, storage arrays such as a redundant array of independent disks (RAID) arrays, storage routers, storage switches and storage directors, and other consumer devices such as video game systems and digital video recorders. These devices provide high storage capacity in a cost effective manner.

Disk drives include one or more drive devices, such as the servo motor that spins the disk at a substantially constant velocity and the actuator that positions one or more read/write heads over the surface of the disk. The demand for increased spin rates, higher track densities, and faster access times provides challenges to the controllers to provide fast and accurate control of these drive devices. However, controllers that exert a great degree of control energy can consume more power and radiate a greater amount of acoustical and electromagnetic noise. Further limitations and disadvantages of conventional and traditional approaches will become apparent to one of ordinary skill in the art through comparison of such systems with the present invention.

SUMMARY OF THE INVENTION

The present invention sets forth a controller and methods for use therewith substantially as shown in and/or described in connection with at least one of the figures, as set forth more completely in the claims that follow.

DETAILED DESCRIPTION OF THE INVENTION INCLUDING THE PRESENTLY PREFERRED EMBODIMENTS

Figure 1:
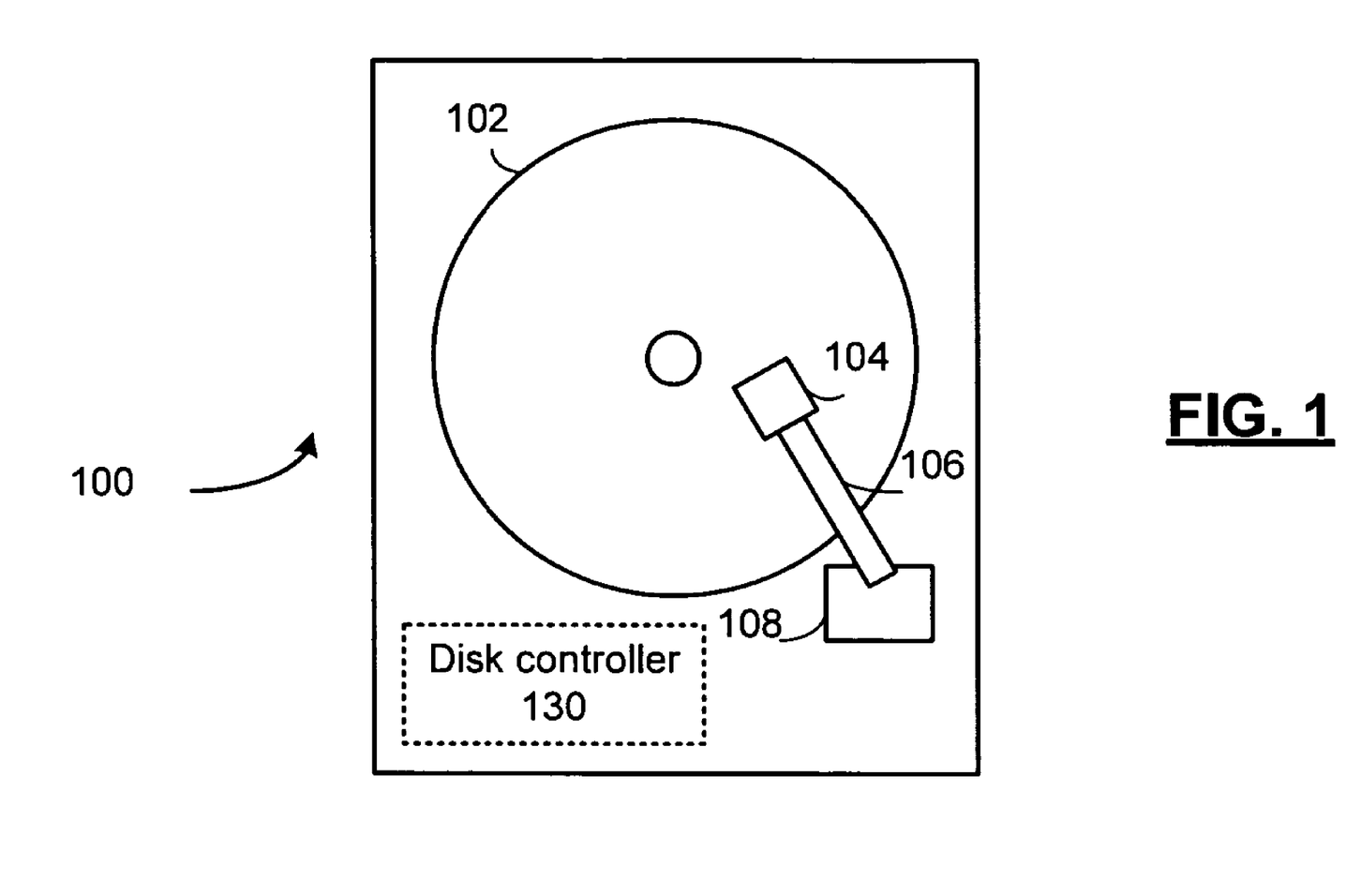
FIG. 1 presents a pictorial representation of a disk drive unit 100 in accordance with an embodiment of the present invention.

FIG. 1 presents a pictorial representation of a disk drive unit 100 in accordance with an embodiment of the present invention. In particular, disk drive unit 100 includes a disk 102 that is rotated by a servo motor (not specifically shown) at a velocity such as 3600 revolutions per minute (RPM), 4200 RPM, 4800 RPM, 5,400 RPM, 7,200 RPM, 10,000 RPM, 15,000 RPM, however, other velocities including greater or lesser velocities may likewise be used, depending on the particular application and implementation in a host device. In an embodiment of the present invention, disk 102 can be a magnetic disk that stores information as magnetic field changes on some type of magnetic medium. The medium can be rigid or nonrigid, removable or nonremovable, that consists of or is coated with magnetic material.

Disk drive unit 100 further includes one or more read/write heads 104 that are coupled to arm 106 that is moved by actuator 108 over the surface of the disk 102 either by translation, rotation or both. In an embodiment of the present invention, the read/write heads 104 include a write element, such as a monopole write element that writes data on the disk with perpendicular magnetic recording (PMR), longitudinal magnetic recording (LMR) or other recording orientation. This allows for greater recording density and greater storage capacity for the drive. However, other recording configurations can likewise be used within the broad scope of the present invention. A disk controller 130 is included for controlling the read and write operations from and to the drive, for controlling the speed of the servo motor and the motion of actuator 108, and for providing an interface to and from the host device.

Disk 102 is recorded during an initialization or manufacturing process, either in the factory when the disk drive 100 is manufactured, or during some disk reformatting/recovery operation. A plurality of servo wedges are written on the disk 102. These servo wedges can be linear; however, non-linear configurations including arcs can also be employed, particularly when disk 102 is implemented in a disk drive, such as disk drive unit 100 that includes an arm 106 that is moved by actuator 108 over the surface of the disk 102 by angular displacement.

Each servo wedge includes a servo field associated with each track and usually each rotational position of the disk. One or more sectors of user or control data are stored along the track between consecutive servo wedges. In particular, a servo field typically begins with control data that includes a preamble and synchronization mark that allow the disk controller to recognize the beginning of the servo field and the beginning of the servo data. An index mark can optionally be included in control data to indicate a particular servo wedge that is the first or "index" wedge for easy decoding by the disk controller. Servo data includes track identification data for identifying the particular track being read, burst data for providing subtrack head alignment data that facilitates control to a track centerline or other reference track position and facilitates track seek movements of the read/write head, etc. In addition, a servo address mark is used for timing generation in the disk controller 130 to time the start time for various events, such as write operations, synchronous identification of a servo wedge during spin-up and spinning of the disk, etc. While not shown, the servo data can also include other data including a head number for a multi-head disk drive, and a wedge number that identifies the current wedge, etc. This data may or may not be additionally encoded via other encryption methods.

Disk controller 130 includes a controller in accordance with one or more functions or features of the present invention, as described in further detail in conjunction with the figures that follow.

Figure 2:
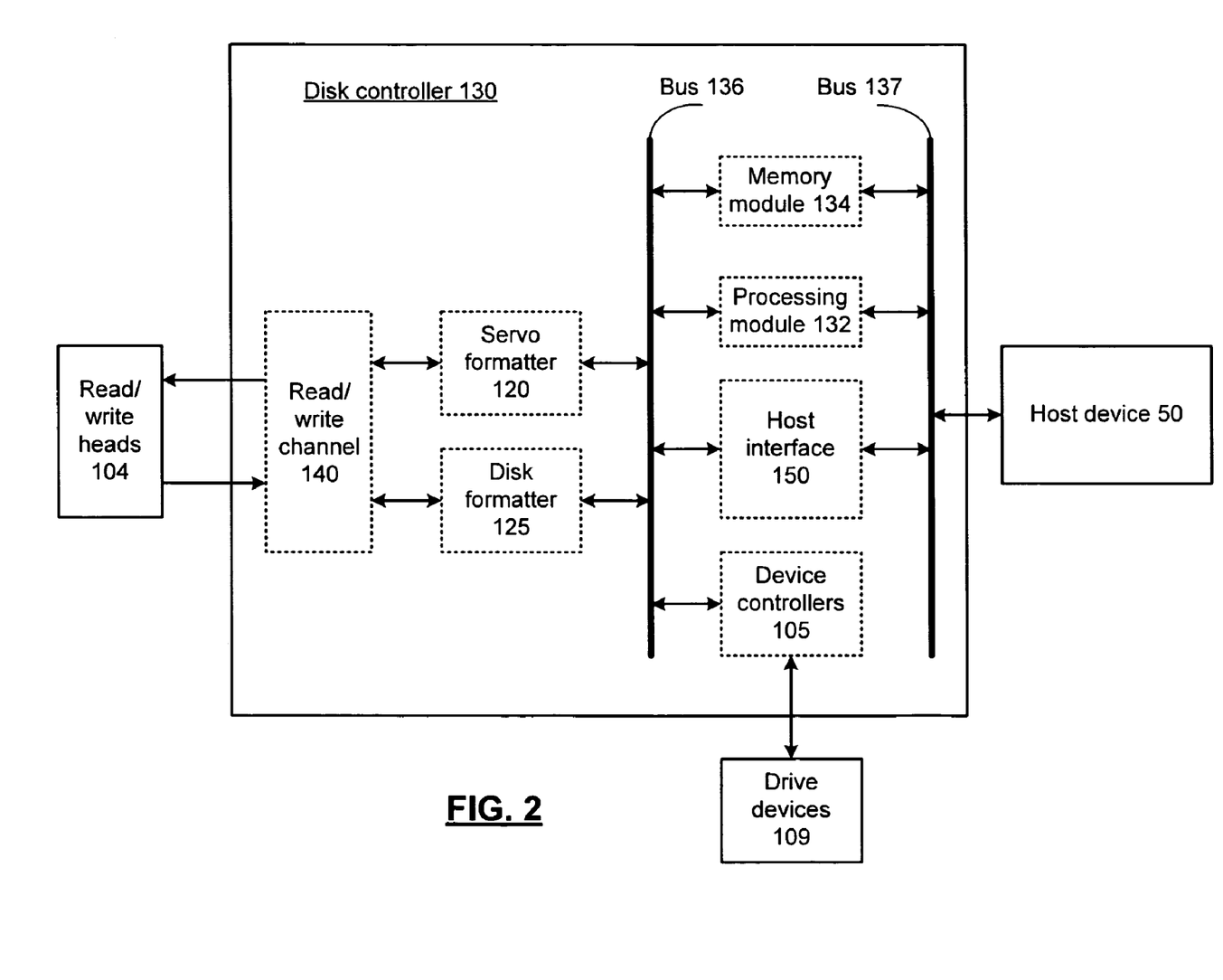
FIG. 2 presents a block diagram representation of a disk controller 130 in accordance with an embodiment of the present invention.

FIG. 2 presents a block diagram representation of a disk controller 130 in accordance with an embodiment of the present invention. In particular, disk controller 130 includes a read/write channel 140 for reading and writing data from and to disk 102 through read/write heads 104. Disk formatter 125 is included for controlling the formatting of data and provides clock signals and other timing signals that control the flow of the data written to, and data read from disk 102. In particular, read/write channel 140 is operably coupled to the read/write head to read the servo data from the disk. Servo formatter 120 is operably coupled to the read/write channel 140 to generate timing and position signals based on the servo data that is read, so that device controllers 105 can control the operation of the plurality of drive devices based on the timing and position signals.

In an embodiment of the present invention, the read/write channel includes a repetition decoder, majority logic detection, matched filter, correlator, integrator and/or maximum likelihood detector for decoding Gray-coded track identification data and the burst data. From this servo data, the track number is extracted by Gray decoding the track identification data. In addition, subtrack position is determined based on the relative magnitudes and/or phases of a plurality of servo bursts. Further details regarding the subtrack control and positioning are presented in U.S. Pat. No. 6,108,151, Sampled Amplitude Read Channel for Reading User Data and Embedded Servo Data from a Magnetic Medium, filed on Apr. 25, 1997. In particular, the track information decoded from the servo data and the subtrack position determined based on the servo bursts can be used by a controller, such as one of device controllers 105, to control the actuator used to position the read/write heads 104.

In addition, the servo formatter 120 generates timing information based on the detected servo address mark for use by device controllers 105 for controlling the actuator 108 and spindle motor, and optionally for generating other timing information used by disk formatter 125 and read/write channel 140 in timing of disk read and/or write operations. Further details regarding the use of servo address mark in such timing operations are presented in pending U.S. patent applications Disk controller and methods for use therewith, having Ser. No. 11/311,725; Media event timer and methods for use therewith, having Ser. No. 11/311,727; and Read/write timing generator and methods for use therewith, having Ser. No. 11/311,726. In particular, the timing of detected servo address marks can be used by a controller, such as one of device controllers 105, to control the velocity of the servo motor that spins the disk 102.

Host interface 150 receives read and write commands from host device 50 and transmits data read from disk 102 along with other control information in accordance with a host interface protocol. In an embodiment of the present invention the host interface protocol can include, small computer system interface (SCSI), serial advanced technology attachment (SATA), enhanced integrated drive electronics (EIDE), or any number of other host interface protocols, either open or proprietary that can be used for this purpose.

Disk controller 130 further includes a processing module 132 and memory module 134. Processing module 132 can be implemented using one or more microprocessors, micro-controllers, digital signal processors, microcomputers, central processing units, field programmable gate arrays, programmable logic devices, state machines, logic circuits, analog circuits, digital circuits, and/or any devices that manipulates signal (analog and/or digital) based on operational instructions that are stored in memory module 134. When processing module 132 is implemented with two or more devices, each device can perform the same steps, processes or functions in order to provide fault tolerance or redundancy. Alternatively, the function, steps and processes performed by processing module 132 can be split between different devices to provide greater computational speed and/or efficiency.

Memory module 134 may be a single memory device or a plurality of memory devices. Such a memory device may be a read-only memory, random access memory, volatile memory, non-volatile memory, static random access memory (SRAM), dynamic random access memory (DRAM), flash memory, cache memory, and/or any device that stores digital information. Note that when the processing module 132 implements one or more of its functions via a state machine, analog circuitry, digital circuitry, and/or logic circuitry, the memory module 134 storing the corresponding operational instructions may be embedded within, or external to, the circuitry comprising the state machine, analog circuitry, digital circuitry, and/or logic circuitry. Further note that, the memory module 134 stores, and the processing module 132 executes, operational instructions that can correspond to one or more of the steps or a process, method and/or function illustrated herein.

Disk controller 130 includes a plurality of modules, in particular, device controllers 105, processing module 132, memory module 134, read/write channel 140, disk formatter 125, servo formatter 120 and host interface 150 that are interconnected via buses 136 and 137. Each of these modules can be implemented in hardware, firmware, software or a combination thereof, in accordance with the broad scope of the present invention. While a particular bus architecture is shown in FIG. 2 with buses 136 and 137, alternative bus architectures that include either a single bus configuration or additional data buses, further connectivity, such as direct connectivity between the various modules, are likewise possible to implement the features and functions included in the various embodiments of the present invention.

In an embodiment of the present invention, one or more modules of disk controller 130 are implemented as part of a system on a chip integrated circuit. In an embodiment of the present invention, this system on a chip integrated circuit includes a digital portion that can include additional modules such as protocol converters, linear block code encoding and decoding modules, etc., and an analog portion that includes additional modules, such as a power supply, disk drive motor amplifier, disk speed monitor, read amplifiers, etc. In a further embodiment of the present invention, the various functions and features of disk controller 130 are implemented in a plurality of integrated circuit devices that communicate and combine to perform the functionality of disk controller 130.

Figure 3:
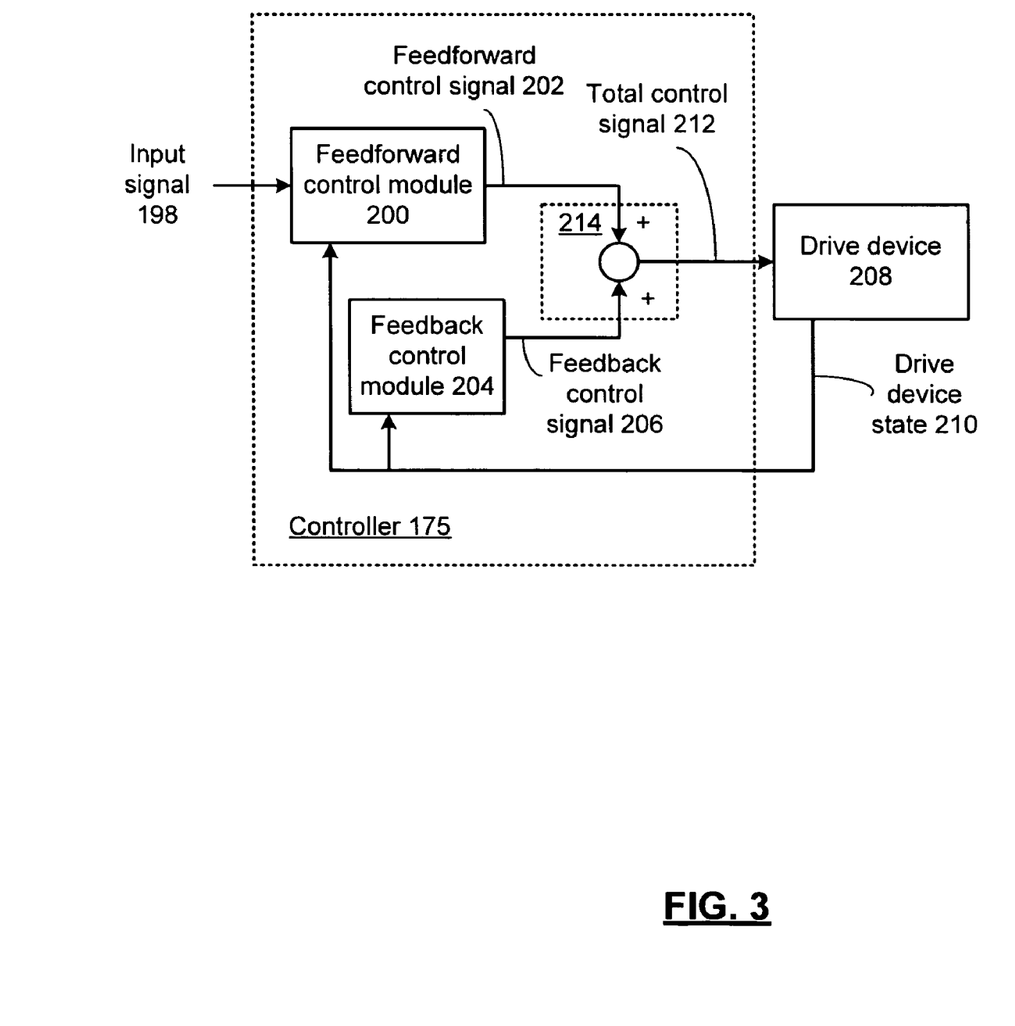
FIG. 3 presents a block diagram representation of a controller 175 in accordance with an embodiment of the present invention.

FIG. 3 presents a block diagram representation of a controller 175 in accordance with an embodiment of the present invention. In particular, controller 175, such as one of the device controllers 105 is presented for use in controlling a drive device 208, such as one of the drive devices 109 of disk drive 100 via a total control signal 212. Controller 175 includes a combining module 214 that generates total control signal 212 by combining a feedback control signal 206 and a feedforward control signal 202. In the embodiment shown, combining module 214 generates total control signal 212 by summing feedback control signal 206 with feedforward control signal 202; however, other combinations are possible including subtracting signals, particularly with other phases, or for instance, other combining functions including weighted sums, conditional combinations, etc.

Feedback control module 204 generates the feedback control signal 206 in response to one or more drive device states 210 that are either measured directly or estimated via state estimation techniques such as Kalman filters, Luenberger observers, etc. Feedback control module 204 regulates one or more outputs of the drive device 208 such as a position of the read/write heads or velocity of the disk drive motor, that can be represented by one or more of the drive device states 210, to track a reference signal. Feedback control module 204 can take on many forms including proportional-integral-derivative (PID) control, pole placement control, state space control, transfer function control, optimal control such as minimum variance, linear quadratic regulators, etc., or any of a wide variety of other controller design techniques or topologies.

Feedforward control module 200 is operably coupled to the combining module to generate the feedforward control signal 202. In particular, the use of feedforward control along with the feedback control of feedback control module 204 provides a robust controller design that can compensate for many types of disturbances. In an embodiment of the present invention, the feedforward control signal 202 is generated based on a smoothing function and a feedforward control function, wherein the smoothing function is determined by evaluating a plurality of candidate smoothing functions by determining a smoothness factor associated with the control signal, such as total control signal 212, that results from each of the plurality of candidate smoothing functions, and selecting the smoothing function as one of the plurality of candidate smoothing functions, based on the smoothness factor.

While traditional control methodologies tend to generate control solutions, such as bang-bang controllers that provide "optimal" results (based on limited optimality criteria) by maximizing the control energy, the present invention provides a smoothing function that smoothes the control signal to reduce or eliminate undesirable electromagnetic or acoustical noise, an/or to reduce the power consumed. In this fashion, the present invention can be used to complement existing control methodologies to yield better results based on these additional performance criteria. Further details regarding feedforward control module 200 are presented in conjunction with FIG. 4 that follows.

Figure 4:
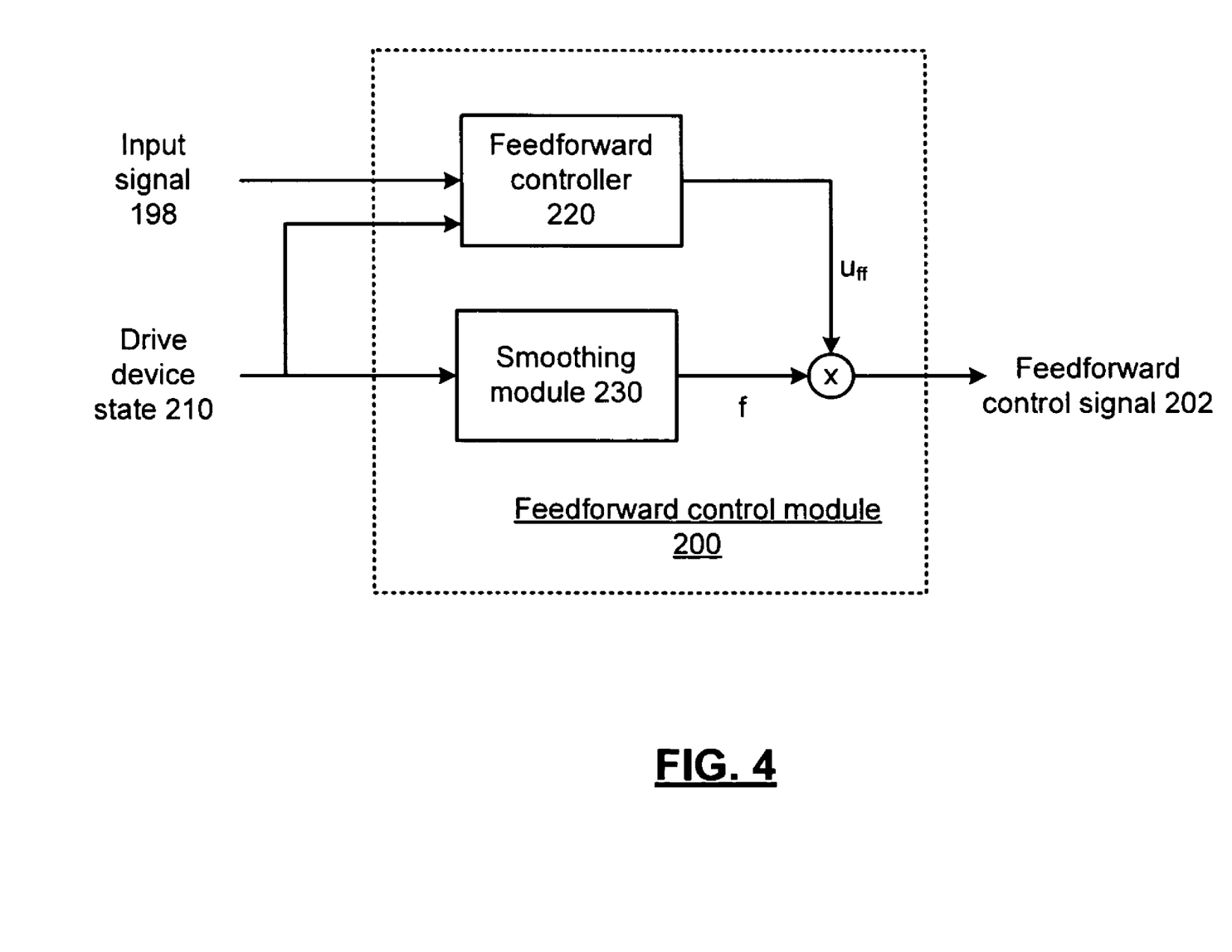
FIG. 4 presents a block diagram representation of a feedforward control module 200 in accordance with an embodiment of the present invention.

FIG. 4 presents a block diagram representation of a feedforward control module 200 in accordance with an embodiment of the present invention. In particular, feedforward control module 200 generates the feedforward control signal 202 as a function, in this case the product, of the smoothing function $f$ from smoothing module 230 and the feedforward control function $u_{ff}$ from feedforward controller 220. In general, the feedforward control function $u_{ff}$ is generated based on an input signal 198, such as a reference signal and at least one drive device state 210. Particular methodologies for the design of the feedforward controller 220 are presented in E. J. Davison, "The Robust Control of a Servomechanism Problem for Linear Time-Invariant Multivariable Systems", *IEEE Transactions on Automatic Control*, Vol. AC-21, No. 1, February 1976, and E. J. Davison, "Multivariable Tuning Regulators: The Feedforward and Robust Control of a General Servomechanism Problem", *IEEE Transactions on Automatic Control*, Vol. AC-21, No. 1, February 1976; however, other feedforward control methodologies can likewise be employed within the broad scope of the present invention.

In an embodiment of the present invention, the candidate smoothing functions are determined in a two step process. In particular, a first function is selected that is a monotonic function, such as monotonically increasing function of the one or more drive device states 210. Considering the drive device state 210 to be represented by x, where x is either a scalar or vector quantity, this first function can be represented by g(x). This function g(x) can be either a linear or nonlinear function selected to have a range, such as between [0,1] to preserve the scaling of the feedforward control function $u_{ff}$. A second function is selected to operate on the first function to generate the candidate smoothing function. The second function $f(\theta)$ can also be selected to have a range between [0,1] to preserve the scaling of feedforward control function $u_{ff}$. In this fashion, the feedforward control signal 202 can be represented as $f(g(x)) \cdot u_{ff}$.

The particular candidate smoothing functions $f(g(x))$ can be continuous functions, linear or nonlinear, that are monotonic over the range of g(x), such as exponential and sinusoidal functions, hyperbolic functions, logarithmic functions, polynomial functions, etc. While a two step process is described, similarly a one step methodology can be employed wherein a candidate smoothing function $f(x)$ is selected directly.

The candidate smoothing functions are evaluated to determine, either empirically or by simulation, the particular control signal, such as total control signal 212 that results from implementing the particular candidate smoothing function. The resulting total control signal for each candidate function $f(g(x))$ is then evaluated by determining a smoothness factor for the control signal. This can be accomplished in several ways; for instance, the value of the control signal can be used to determine a peak, peak power, or total power over a time period of interest. Also, the value, magnitude, peak or weighted sum of one or more derivatives of the control signal, such as the first and second derivative of the control signal, can likewise be evaluated either based on their peak values or over a time period of interest. In addition, candidate smoothing functions that do not meet traditional control criteria based on the performance of the overall drive device, such as rise time, steady-state error, percent overshoot, disturbance rejection, stability, etc., can also be eliminated. In this fashion, a candidate smoothing function can be selected as the smoothing function 230 based on the particular candidate smoothing function that provides acceptable control characteristics and that provides the most favorable smoothness factor, such as the particular candidate smoothing function with lowest control power, smallest peak derivatives, etc.

The methodology described above can yield a complicated smoothing function $f(g(x))$ that may be difficult to calculate on a real-time basis in some control implementations. In these circumstances, an approximation of the selected one of the plurality of candidate smoothing functions is generated and the feedforward control module 200 is further operable to generating the feedforward control signal 202 as a function of the approximation of the selected one of the plurality of smoothing functions and the feedforward control function. Many numerical approximations can be employed, based on the accuracy required and the particular smoothing function $f(g(x))$ that is selected. Polynomial approximations including Taylor series, Bernstein polynomials, Chebyshev polynomials, Lagrange polynomials, Hermite polynomials, Padé polynomials, Bézier polynomials can be employed as well as piecewise linear and polynomial approximations, other functional approximations, and other approximation techniques.

The operation of the present invention can be described further in light of the following example. Consider a hard disk drive that includes a controller that controls the position of a read/write head from one track to another track of the disk, via a current controlled actuator. A discrete-time state-space controller has been designed with feedback and feedforward control that is based, among others, on the states $x_1$ and $x_2$ corresponding, respectively, to the position and velocity of the actuator and estimated as $x'_1$ and $x'_2$. Candidate smoothing functions $f(g(x))$ are determined, for instance, based on the following equations:

$$g(x) = \max(0, \min(1, \delta|x'_1| + \epsilon|x'_2| + \sigma)$$

$$f(g(x)) = \rho(1 - g(x))^\tau$$

where $\delta$, $\epsilon$, $\sigma$, $\rho$, and $\tau$ are constants.

A particular smoothing function is determined by:
1. Selecting candidate values for $\delta$, $\epsilon$, $\sigma$, $\rho$, and $\tau$;
2. Simulating or empirically measuring or observing the system to determine the total control signal, in this case, the control current that results;
3. Evaluating the smoothness factor for the control current based, for instance, on the sum of the peak value of the first and second derivatives of the control current;
4. Eliminating candidate values that do not meet system performance criteria in terms of rise time and steady state error;
5. Repeating steps 1-4 for possible values of $\delta$, $\epsilon$, $\sigma$, $\rho$, and $\tau$;
6. Selecting the smoothing function as the particular candidate with the best smoothness factor;
7. Approximating the smoothing function with, for instance, a Chebyshev node/approximation technique.

While the example above evaluated a plurality of smoothing functions to determine a "best" smoothing factor, in an alternative embodiment, a smoothing factor threshold could be set and the method can operate until the smoothing factor threshold is reached or exceeded.

Figure 5:
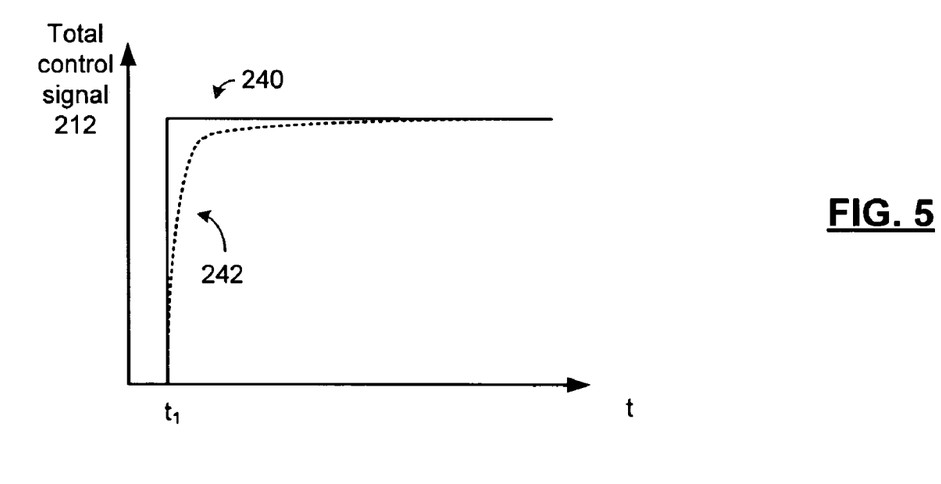
FIG. 5 presents a graphical representation of a first example of the operation of controller 175 in accordance with an embodiment of the present invention.

FIG. 5 presents a graphical representation of a first example of the operation of controller 175 in accordance with an embodiment of the present invention. In particular, two results for total control signal 212 are presented, including a first result 240 without the smoothing function and a second result 242 with the smoothing function implemented in accordance with an embodiment of the present invention. In particular, at time $t_1$, the feedforward and feedback controls produce a change in the total control signal in response to, for instance, a new target position/track of a hard disk drive. In the first result 240, the controller produces, in a bang-bang fashion, a step change in total control signal 212. This step produces very high magnitude first and second derivatives at time $t_1$, and potential acoustic and electromagnetic radiation problems. However, with the smoothing function of the present invention engaged in the feedforward control module 200, the results 242 are smoothed, with lower first derivatives and second derivatives; and a lesser potential for undesirable acoustical and electromagnetic noise generation; and with lower power.

Figure 6:
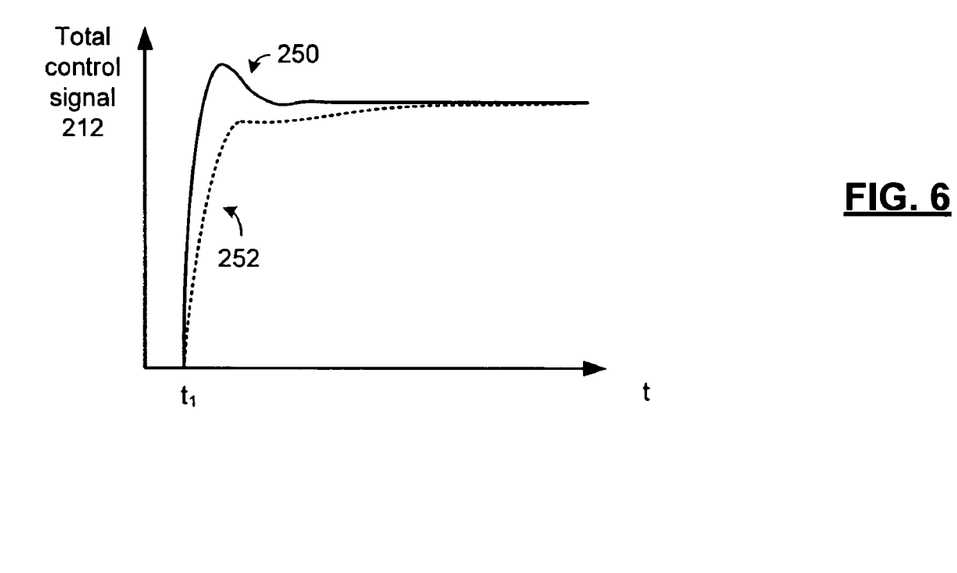
FIG. 6 presents a graphical representation of a second example of the operation of controller 175 in accordance with an embodiment of the present invention.

FIG. 6 presents a graphical representation of a second example of the operation of controller 175 in accordance with an embodiment of the present invention. In particular, two results for total control signal 212 are presented, including a first result 250 without smoothing function and a second result 252 with the smoothing function implemented in accordance with an embodiment of the present invention. Like the example presented in conjunction with FIG. 5, at time $t_1$, the feedforward and feedback controls produce a change in the total control signal in response to, for instance, a new target position/track of a hard disk drive. In the first result 250, the controller produces an underdamped step change in total control signal 212. This also produces high magnitude first and second derivatives at time $t_1$, and potential acoustic and electromagnetic radiation problems. However, with the smoothing function of the present invention engaged in the feedforward control module 200, the results 252 are smoothed, with lower first derivatives and second derivatives; and a lesser potential for undesirable acoustical and electromagnetic noise generation; and with lower power.

Figure 7:
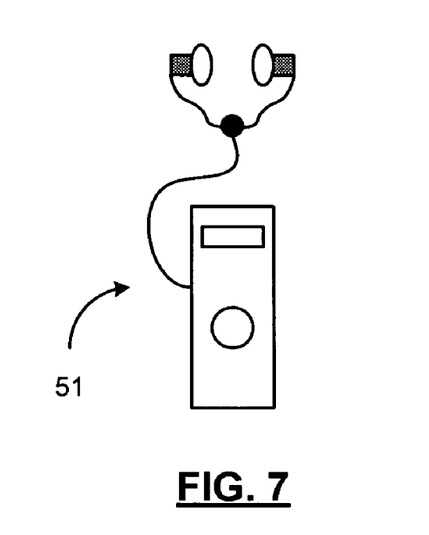
FIG. 7 presents a pictorial representation of a handheld audio unit 51 in accordance with an embodiment of the present invention.

FIG. 7 presents a pictorial representation of a handheld audio unit 51 in accordance with an embodiment of the present invention. In particular, disk drive unit 100 can include a small form factor magnetic hard disk whose disk 102 has a diameter 1.8" or smaller that is incorporated into or otherwise used by handheld audio unit 51 to provide general storage or storage of audio content such as motion picture expert group (MPEG) audio layer 3 (MP3) files or Windows Media Architecture (WMA) files, video content such as MPEG4 files for playback to a user, and/or any other type of information that may be stored in a digital format.

Figure 8:
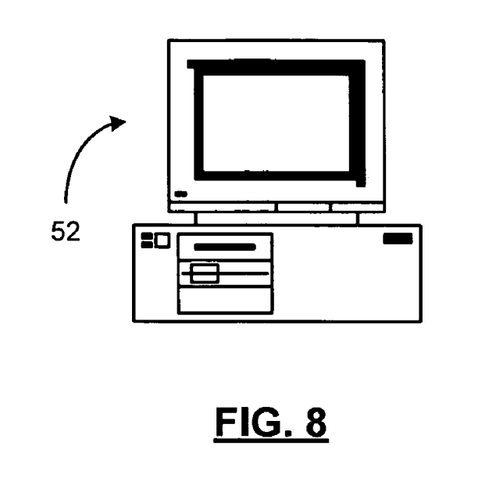
FIG. 8 presents a pictorial representation of a computer 52 in accordance with an embodiment of the present invention.

FIG. 8 presents a pictorial representation of a computer 52 in accordance with an embodiment of the present invention. In particular, disk drive unit 100 can include a small form factor magnetic hard disk whose disk 102 has a diameter 1.8" or smaller, a 2.5" or 3.5" drive or larger drive for applications such as enterprise storage applications. Disk drive 100 is incorporated into or otherwise used by computer 52 to provide general purpose storage for any type of information in digital format. Computer 52 can be a desktop computer, or an enterprise storage device such as a server, of a host computer that is attached to a storage array such as a redundant array of independent disks (RAID) array, storage router, edge router, storage switch and/or storage director.

Figure 9:
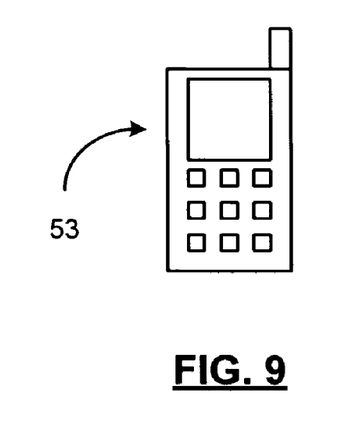
FIG. 9 presents a pictorial representation of a wireless communication device 53 in accordance with an embodiment of the present invention.

FIG. 9 presents a pictorial representation of a wireless communication device 53 in accordance with an embodiment of the present invention. In particular, disk drive unit 100 can include a small form factor magnetic hard disk whose disk 102 has a diameter 1.8" or smaller that is incorporated into or otherwise used by wireless communication device 53 to provide general storage or storage of audio content such as motion picture expert group (MPEG) audio layer 3 (MP3) files or Windows Media Architecture (WMA) files, video content such as MPEG4 files, JPEG (joint photographic expert group) files, bitmap files and files stored in other graphics formats that may be captured by an integrated camera or downloaded to the wireless communication device 53, emails, webpage information and other information downloaded from the Internet, address book information, and/or any other type of information that may be stored in a digital format.

In an embodiment of the present invention, wireless communication device 53 is capable of communicating via a wireless telephone network such as a cellular, personal communications service (PCS), general packet radio service (GPRS), global system for mobile communications (GSM), and integrated digital enhanced network (iDEN) or other wireless communications network capable of sending and receiving telephone calls. Further, wireless communication device 53 is capable of communicating via the Internet to access email, download content, access websites, and provide steaming audio and/or video programming. In this fashion, wireless communication device 53 can place and receive telephone calls, text messages such as emails, short message service (SMS) messages, pages and other data messages that can include attachments such as documents, audio files, video files, images and other graphics.

Figure 10:
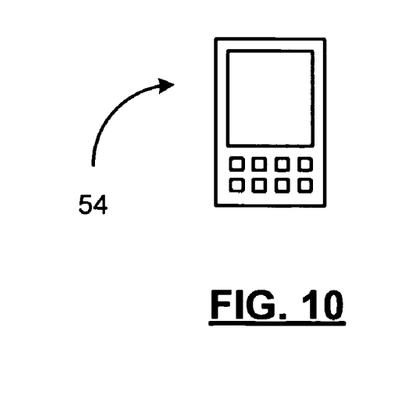
FIG. 10 presents a pictorial representation of a personal digital assistant 54 in accordance with an embodiment of the present invention.

FIG. 10 presents a pictorial representation of a personal digital assistant 54 in accordance with an embodiment of the present invention. In particular, disk drive unit 100 can include a small form factor magnetic hard disk whose disk 102 has a diameter 1.8" or smaller that is incorporated into or otherwise used by personal digital assistant 54 to provide general storage or storage of audio content such as motion picture expert group (MPEG) audio layer 3 (MP3) files or Windows Media Architecture (WMA) files, video content such as MPEG4 files, JPEG (joint photographic expert group) files, bitmap files and files stored in other graphics formats, emails, webpage information and other information downloaded from the Internet, address book information, and/or any other type of information that may be stored in a digital format.

Figure 11:
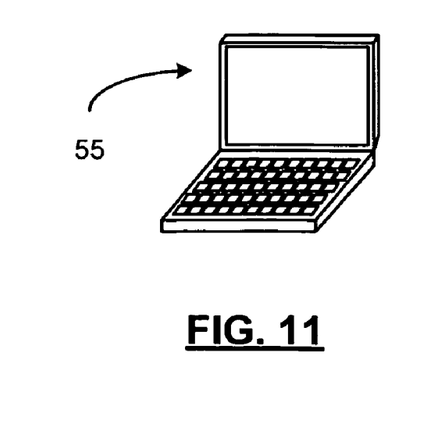
FIG. 11 presents a pictorial representation of a laptop computer 55 in accordance with an embodiment of the present invention.

FIG. 11 presents a pictorial representation of a laptop computer 55 in accordance with an embodiment of the present invention. In particular, disk drive unit 100 can include a small form factor magnetic hard disk whose disk 102 has a diameter 1.8" or smaller, or a 2.5" drive. Disk drive 100 is incorporated into or otherwise used by laptop computer 55 to provide general purpose storage for any type of information in digital format.

Figure 12:
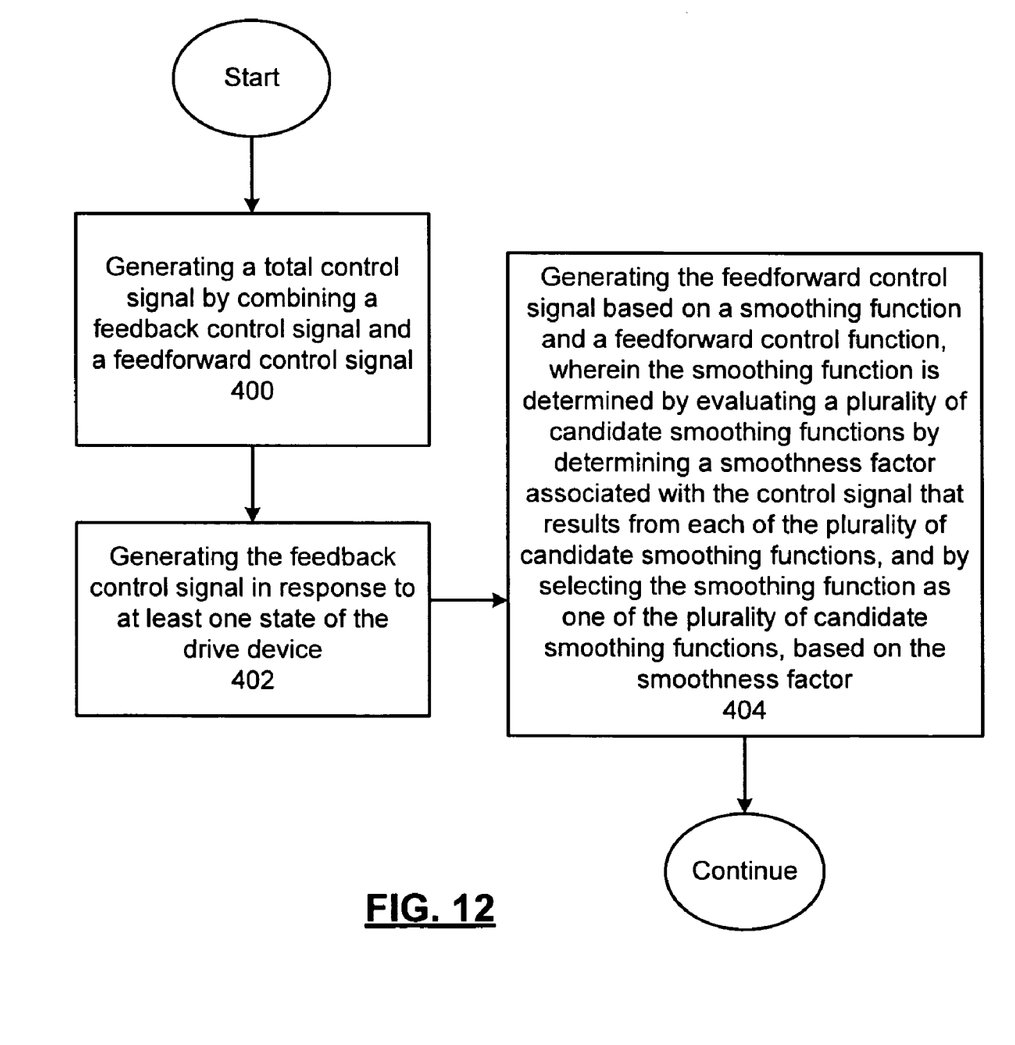
FIG. 12 presents a flowchart representation of a method in accordance with an embodiment of the present invention.

FIG. 12 presents a flowchart representation of a method in accordance with an embodiment of the present invention. In particular, a method is presented that can be used in conjunction with one or more of the features or functions described in association with FIGS. 1-11. In step 400, a total control signal is generated by combining a feedback control signal and a feedforward control signal. In step 402, the feedback control signal is generated in response to at least one state of the drive device. In step 404, the feedforward control signal is generated based on a smoothing function and a feedforward control function, wherein the smoothing function is determined by: evaluating a plurality of candidate smoothing functions by determining a smoothness factor associated with the control signal that results from each of the plurality of candidate smoothing functions; and selecting the smoothing function as one of the plurality of candidate smoothing functions, based on the smoothness factor.

In an embodiment of the present invention, step 404 further includes selecting one of the plurality of candidate smoothing functions by selecting a first function that is a monotonic function; and selecting a second function that operates on the first function to generate the candidate smoothing function. Further step 404 can include generating an approximation of the selected one of the plurality of candidate smoothing functions; and generating the feedforward control signal as a function of the approximation of the selected one of the plurality of smoothing functions and the feedforward control function of an input signal. The approximation of the selected one of the plurality of candidate smoothing functions can be generated as a polynomial function and can include a piecewise approximation. Step 404 can include generating the feedforward control signal as a product of the smoothing function and the feedforward control function of an input signal. Further two or more of the plurality of candidate smoothing functions are strictly monotonic.

In an embodiment, the smoothness factor is generated for at least one of the plurality of candidate smoothing functions, by determining, for instance, a value of at least one of: the total control function, a first derivative of the total control function, and a second derivative of the total control function. Further, the smoothness factor can be generated for at least one of the plurality of candidate smoothing functions, by determining a value, as a function of time, of at least one of: the total control function, a first derivative of the total control function, and a second derivative of the total control function.

Figure 13:
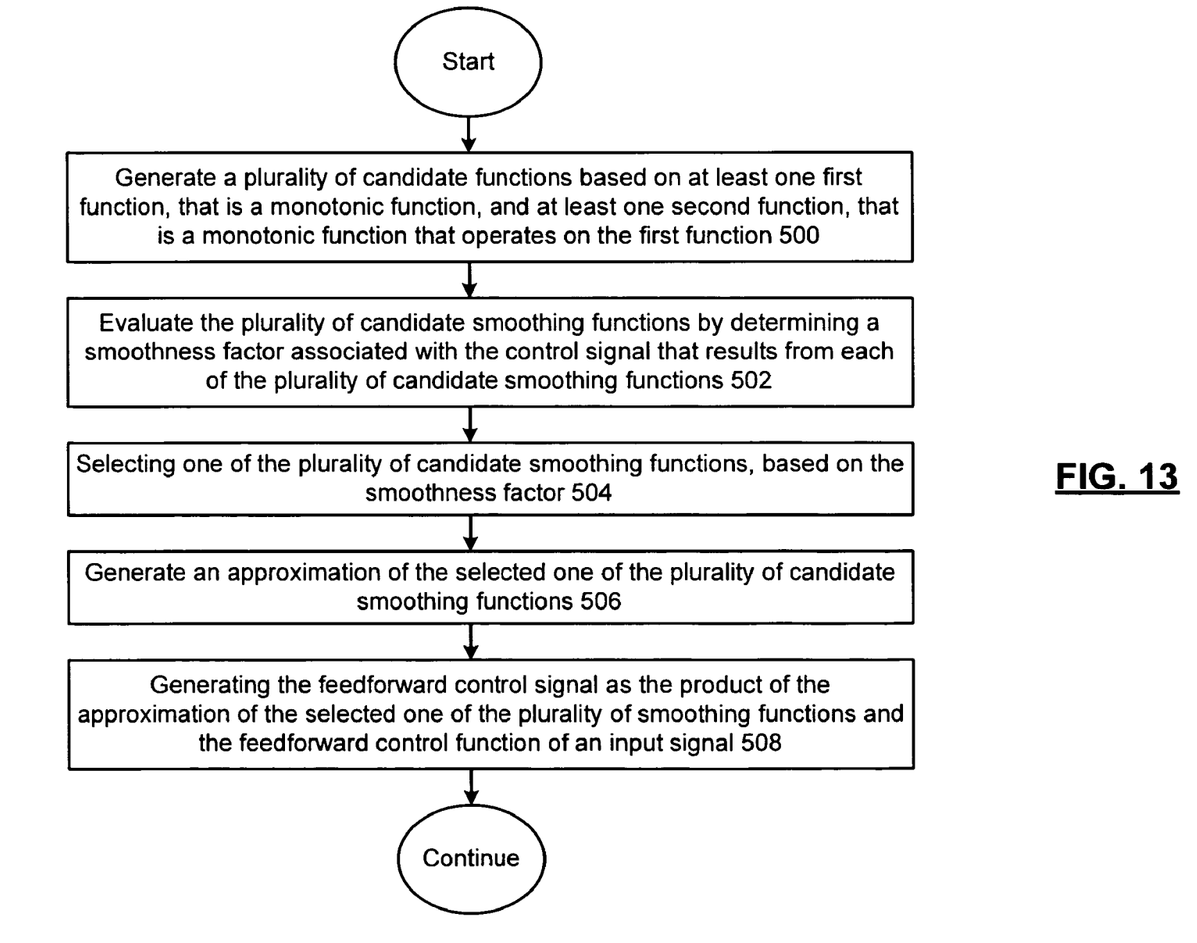
FIG. 13 presents a flowchart representation of a method in accordance with an embodiment of the present invention.

FIG. 13 presents a flowchart representation of a method in accordance with an embodiment of the present invention. A method is presented that can be used in conjunction with one or more of the features or functions described in association with FIGS. 1-12. In particular, a method is presented for use in conjunction with Step 404 of FIG. 12. In step 500 a plurality of candidate smoothing functions are generated by selecting a first function that is a monotonic function; and selecting a second function that operates on the first function to generate the candidate smoothing function. In step 502, the plurality of candidate smoothing functions are evaluated by determining a smoothness factor associated with the control signal that results from each of the plurality of candidate smoothing functions. In step 504, one of the plurality of candidate smoothing functions is selected, having the most favorable smoothness factor. In step 506, an approximation of the selected one of the plurality of candidate smoothing functions is generated. In step 508, the feedforward control signal is generated as a product of the approximation of the selected one of the plurality of smoothing functions and the feedforward control function of an input signal.

While the present invention has been described in terms of a magnetic disk, other nonmagnetic storage devices including optical disk drives including compact disks (CD) drives such as CD-R and CD-RW, digital video disk (DVD) drives such as DVD-R, DVD+R, DVD-RW, DVD+RW, etc. can likewise be implemented in accordance with the functions and features of the presented invention described herein.

Further, while the controller 175 has been described in terms of its use for controlling a drive device of a disk drive, such as a hard disk drive, controller 175 has many alternative uses in the control of a wide variety of other systems and devices.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The various circuit components can be implemented using 0.35 micron or smaller CMOS technology. Provided however that other circuit technologies, both integrated or non-integrated, may be used within the broad scope of the present invention. Likewise, various embodiments described herein can also be implemented as software programs running on a computer processor. It should also be noted that the software implementations of the present invention can be stored on a tangible storage medium such as a magnetic or optical disk, read-only memory or random access memory and also be produced as an article of manufacture.

Thus, there has been described herein an apparatus and method, as well as several embodiments including a preferred embodiment, for implementing a controller for controlling a system such as a drive device of a disk drive. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A controller for use in controlling a system by generating a total control signal, the controller comprising:
   a combining module that generates a total control signal by combining a feedback control signal and a feedforward control signal;
   a feedback control module, operably coupled to the combining module, that generates the feedback control signal in response to at least one state of the system; and
   a feedforward control module, operably coupled to the combining module, that generates the feedforward control signal based on a smoothing function and a feedforward control function, wherein the smoothing function is selected as one of a plurality of candidate smoothing functions, based on a smoothness factor.

2. The controller of claim 1 wherein the smoothing function is further determined by:
   selecting one of the plurality of candidate smoothing functions by selecting a first function that is a monotonic function; and selecting a second function that operates on the first function to generate the candidate smoothing function.

3. The controller of claim 2 wherein the wherein the smoothing function is further determined by generating an approximation of the selected one of the plurality of candidate smoothing functions, and the feedforward control module is further operable to:
   generate the feedforward control signal as a function of the approximation of the selected one of the plurality of smoothing functions and the feedforward control function of an input signal.

4. The controller of claim 3 wherein the approximation of the selected one of the plurality of candidate smoothing functions is generated as a polynomial function.

5. The controller of claim 3 wherein the approximation of the selected one of the plurality of candidate smoothing functions includes a piecewise approximation.

6. The controller of claim 2 wherein at least two of the plurality of candidate smoothing functions are strictly monotonic.

7. The controller of claim 2 wherein the smoothness factor is generated for at least one of the plurality of candidate smoothing functions, by determining a value of at least one of: the total control function, a first derivative of the total control function, and a second derivative of the total control function.

8. The controller of claim 2 wherein the smoothness factor is generated for at least one of the plurality of candidate smoothing functions, by determining a value, as a function of time, of at least one of: the total control function, a first derivative of the total control function, and a second derivative of the total control function.

9. The controller of claim 1 wherein the feedforward control module is further operable to:
   generate the feedforward control signal as a product of the smoothing function and the feedforward control function of an input signal.

10. The controller of claim 1 wherein the system includes an actuator for controlling the position of at least one read/write head of a disk drive.

11. A method for use in controlling a drive device of a disk drive by generating a total control signal, the method comprising:
   generating a total control signal by combining a feedback control signal and a feedforward control signal;
   generating the feedback control signal in response to at least one state of the drive device; and
   generating the feedforward control signal based on a smoothing function and a feedforward control function, wherein the smoothing function is determined by selecting the smoothing function as one of a plurality of candidate smoothing functions, based on a smoothness factor.

12. The method of claim 11 wherein the step of generating the feedforward control signal further includes:
   selecting one of the plurality of candidate smoothing functions by selecting a first function that is a monotonic function; and
   selecting a second function that operates on the first function to generate the candidate smoothing function.

13. The method of claim 12 wherein the step of generating the feedforward control signal further includes:
   generating an approximation of the selected one of the plurality of candidate smoothing functions;
   generating the feedforward control signal as a function of the approximation of the selected one of the plurality of smoothing functions and the feedforward control function of an input signal.

14. The method of claim 13 wherein the approximation of the selected one of the plurality of candidate smoothing functions is generated as a polynomial function.

15. The method of claim 13 wherein the approximation of the selected one of the plurality of candidate smoothing functions includes a piecewise approximation.

16. The method of claim 12 wherein at least two of the plurality of candidate smoothing functions are strictly monotonic.

17. The method of claim 12 wherein the smoothness factor is generated for at least one of the plurality of candidate smoothing functions, by determining a value of at least one of: the total control function, a first derivative of the total control function, and a second derivative of the total control function.

18. The method of claim 12 wherein the smoothness factor is generated for at least one of the plurality of candidate smoothing functions, by determining a value, as a function of time, of at least one of: the total control function, a first derivative of the total control function, and a second derivative of the total control function 19. The method of claim 11 wherein the step of generating the feedforward control signal further includes:
  generating the feedforward control signal as a product of the smoothing function and the feedforward control function of an input signal.

* * * * *